United States Patent
Gil et al.

(10) Patent No.: US 11,265,403 B2
(45) Date of Patent: *Mar. 1, 2022

(54) CUSTOMIZED DATA RETRIEVAL APPLICATIONS FOR MOBILE DEVICES PROVIDING INTERPRETATION OF MARKUP LANGUAGE DATA

(71) Applicant: Google LLC, Mountain View, CA (US)

(72) Inventors: Elad Gil, San Francisco, CA (US); Shumeet Baluja, La Jolla, CA (US); Maryam Garrett, Boston, MA (US); Cedric Beust, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 149 days.

This patent is subject to a terminal disclaimer.

(21) Appl. No.: 16/796,930

(22) Filed: Feb. 20, 2020

(65) Prior Publication Data

US 2020/0252491 A1 Aug. 6, 2020

Related U.S. Application Data

(60) Continuation of application No. 14/329,158, filed on Jul. 11, 2014, now Pat. No. 10,582,030, which is a
(Continued)

(51) Int. Cl.
*H04M 1/00* (2006.01)
*G06F 16/248* (2019.01)
*H04M 1/72445* (2021.01)

(52) U.S. Cl.
CPC ............ *H04M 1/00* (2013.01); *G06F 16/248* (2019.01); *H04M 1/72445* (2021.01)

(58) Field of Classification Search
CPC ... H04M 1/00; H04M 1/72445; G06F 16/248; G06F 16/957; G06F 16/951
See application file for complete search history.

(56) References Cited

U.S. PATENT DOCUMENTS 6,501,956 B1 12/2002 Weeren et al.
6,668,369 B1 12/2003 Krebs et al.
(Continued)

FOREIGN PATENT DOCUMENTS

EP 1085468 3/2001
JP H11088419 3/1999
(Continued)

OTHER PUBLICATIONS

Advisory Action mailed by the United States Patent and Trademark Office dated Dec. 17, 2008 in U.S. Appl. No. 11/243,916 (Total 3 pages).
(Continued)

*Primary Examiner* — Ankur Jain
(74) *Attorney, Agent, or Firm* — Dority & Manning, P.A.

(57) ABSTRACT

Systems and techniques, including computer software, for retrieving information to a mobile device involve installing a data retrieval application on the mobile device. The data retrieval application includes instructions for presenting a structured data display on the mobile device, defining a structure of the structured data display, requesting selected hyperlinks included in the structured data display, and rendering markup language information received in response to the selected hyperlinks. A user request to retrieve data through the data retrieval application is received, and data is retrieved in response to the received user request. The retrieved data is displayed according to the structure of the structured data display, and a user can select a hyperlink in the displayed data to retrieve and render markup language information using the data retrieval application.

20 Claims, 10 Drawing Sheets

Related U.S. Application Data division of application No. 11/229,980, filed on Sep. 19, 2005, now Pat. No. 8,781,532.

(56) References Cited

U.S. PATENT DOCUMENTS

| | | | |
|---|---|---|---|
| 6,675,204 B2 * | 1/2004 | De Boor | G06F 16/9562 709/217 |
| 6,892,067 B1 | 5/2005 | Sharma et al. | |
| 6,990,454 B2 * | 1/2006 | McIntosh | G06Q 20/305 704/273 |
| 7,051,080 B1 * | 5/2006 | Paul | H04L 67/303 709/217 |
| 7,130,800 B1 * | 10/2006 | Currey | G06F 21/32 704/273 |
| 7,512,896 B2 * | 3/2009 | Rockey | G06F 9/451 715/779 |
| 7,577,910 B1 | 8/2009 | Husemann et al. | |
| 7,634,228 B2 * | 12/2009 | White | H04L 41/22 |
| 7,873,872 B1 * | 1/2011 | Shillington | G06F 11/362 717/124 |
| 8,036,991 B2 * | 10/2011 | Kuhn | G06Q 30/00 705/65 |
| 8,107,449 B2 * | 1/2012 | Hein-Magnussen | H04L 67/16 370/338 |
| 8,112,768 B2 * | 2/2012 | Wu | G06F 16/9535 719/320 |
| 8,185,053 B2 * | 5/2012 | Rekimoto | H04L 51/04 455/41.3 |
| 8,249,559 B1 * | 8/2012 | Meiss | H04L 9/0825 455/412.1 |
| 8,418,065 B2 * | 4/2013 | Conley | H04L 29/06 715/740 |
| 8,694,925 B1 * | 4/2014 | Beust | G06F 40/134 715/866 |
| 8,701,010 B2 * | 4/2014 | Plamondon | H04L 67/2847 715/736 |
| 8,781,532 B2 | 7/2014 | Gil et al. | |
| 8,892,465 B2 * | 11/2014 | Mikkelsen | G06Q 50/184 705/27.1 |
| 8,954,870 B2 * | 2/2015 | Martin | G06F 8/38 715/763 |
| 9,164,963 B2 * | 10/2015 | Chanda | G06Q 30/04 |
| 9,183,571 B2 * | 11/2015 | Kansal | G06Q 30/0261 |
| 9,405,557 B2 * | 8/2016 | Park | G06F 9/452 |
| 9,426,202 B2 * | 8/2016 | Burckart | H04L 67/02 |
| 9,471,466 B1 * | 10/2016 | Garcia | G06F 11/3664 |
| 9,535,563 B2 * | 1/2017 | Hoffberg | G06Q 30/0255 |
| 9,563,449 B2 * | 2/2017 | Burckart | G06F 9/45529 |
| 9,612,724 B2 * | 4/2017 | Laborczfalvi | G06F 3/0484 |
| 9,614,987 B2 * | 4/2017 | Yun | G06F 3/1232 |
| 9,615,211 B2 * | 4/2017 | Matsumoto | H04L 67/04 |
| 9,659,012 B2 * | 5/2017 | Thatte | G06F 16/00 |
| 9,716,774 B2 * | 7/2017 | Brodersen | H04L 67/36 |
| 9,741,060 B2 * | 8/2017 | Carter | G06Q 30/06 |
| 9,794,133 B2 * | 10/2017 | Pohja | H04L 41/22 |
| 10,083,156 B2 * | 9/2018 | Burckart | G06F 16/9577 |
| 10,097,977 B2 * | 10/2018 | Oh | H04M 7/0036 |
| 10,154,526 B2 * | 12/2018 | Borden | H04W 76/10 |
| 10,187,904 B2 * | 1/2019 | Van Loon | H04W 4/50 |
| 10,346,501 B2 * | 7/2019 | Burckart | G06F 16/972 |
| 10,454,701 B2 * | 10/2019 | Kim | H04L 51/18 |
| 10,540,485 B2 * | 1/2020 | Smaltz | A63F 13/61 |
| 10,749,730 B2 * | 8/2020 | Jowett | G06F 8/61 |
| RE48,295 E * | 11/2020 | Kuisma | H04W 4/12 |
| 10,884,513 B2 * | 1/2021 | Venkataraman | G06F 16/3322 |
| 10,929,410 B2 * | 2/2021 | Aravamudan | G06F 3/04842 |
| 10,949,634 B2 * | 3/2021 | Wang | G06K 7/10732 |
| 10,951,681 B2 * | 3/2021 | Vegesna-Venkata | G06F 40/166 |
| 11,003,419 B2 * | 5/2021 | Edmonds | G06F 3/167 |
| 11,029,903 B2 * | 6/2021 | Chang | G06Q 20/3224 |
| 11,096,056 B2 * | 8/2021 | Chang | H04L 67/16 |
| 11,099,729 B1 * | 8/2021 | Ho | G06Q 30/0643 |
| 2002/0067766 A1 * | 6/2002 | Sakamoto | H04N 21/858 375/240 |
| 2002/0074972 A1 | 6/2002 | Narang et al. | |
| 2002/0099456 A1 * | 7/2002 | McLean | H04L 12/282 700/83 |
| 2002/0116415 A1 | 8/2002 | Dutta et al. | |
| 2002/0165847 A1 * | 11/2002 | McCartney | G06F 16/9577 |
| 2003/0135825 A1 * | 7/2003 | Gertner | G06F 8/38 715/230 |
| 2003/0182625 A1 * | 9/2003 | Davidov | H04L 67/02 715/234 |
| 2003/0182626 A1 * | 9/2003 | Davidov | G06F 9/45516 715/234 |
| 2004/0012627 A1 * | 1/2004 | Zakharia | G06F 16/9577 715/744 |
| 2004/0019683 A1 * | 1/2004 | Lee | H04L 67/16 709/227 |
| 2004/0103696 A1 * | 6/2004 | Kim | D06F 39/02 68/17 R |
| 2004/0153445 A1 | 7/2004 | Sheem | |
| 2005/0034084 A1 * | 2/2005 | Ohtsuki | G06F 3/0485 715/864 |
| 2005/0050474 A1 * | 3/2005 | Bells | G06F 9/451 715/747 |
| 2005/0139674 A1 * | 6/2005 | Ishibashi | H04M 1/72415 235/454 |
| 2005/0221829 A1 * | 10/2005 | Nishida | G01S 11/06 455/440 |
| 2006/0026527 A1 * | 2/2006 | Bells | H04M 1/72427 715/747 |
| 2006/0074780 A1 * | 4/2006 | Taylor | G06Q 40/00 705/35 |
| 2006/0107236 A1 * | 5/2006 | Etgen | G06F 40/174 715/833 |
| 2006/0143297 A1 * | 6/2006 | Korhonen | H04M 1/72427 709/227 |
| 2006/0233134 A1 * | 10/2006 | Cromer | H04W 28/22 370/329 |
| 2007/0054627 A1 * | 3/2007 | Wormaid | G06F 9/4856 455/70 |
| 2007/0066364 A1 * | 3/2007 | Gil | G06F 16/248 455/566 |
| 2007/0135150 A1 * | 6/2007 | Ushiki | H04W 12/062 455/509 |
| 2007/0197260 A1 * | 8/2007 | Randall | H04M 1/72445 455/557 |
| 2008/0223721 A1 * | 9/2008 | Cohen | F16K 99/0026 204/451 |
| 2009/0028494 A1 * | 1/2009 | Cho | H05K 1/0274 385/14 |
| 2009/0037559 A1 * | 2/2009 | Ran | H04L 41/509 709/219 |
| 2010/0157941 A1 * | 6/2010 | Raghothaman | H04W 36/00837 370/331 |
| 2010/0273219 A1 * | 10/2010 | May | B01L 3/502738 435/91.5 |
| 2011/0126910 A1 * | 6/2011 | May | B01F 15/0429 137/1 |
| 2011/0177530 A1 * | 7/2011 | Corcoran | G01N 33/54366 435/7.92 |
| 2011/0206576 A1 * | 8/2011 | Woudenberg | B01L 3/502738 422/504 |
| 2014/0149397 A1 | 5/2014 | Gil et al. | |
| 2014/0329566 A1 | 11/2014 | Gil et al. | |
| 2020/0402714 A1 * | 12/2020 | Yoon | H01G 2/22 |

FOREIGN PATENT DOCUMENTS

| | | |
|---|---|---|
| JP | 2001125929 | 5/2001 |
| JP | 2002510819 | 4/2002 |
| JP | 2002170030 | 6/2002 |
| JP | 2002183033 | 6/2002 |
| JP | 2003067334 | 3/2003 |
| JP | 2003091478 | 3/2003 |
| JP | 2003509785 | 3/2003 |

(56) References Cited

FOREIGN PATENT DOCUMENTS

| JP | 2005517244 | 6/2005 |
|---|---|---|
| KR | 1020040044784 | 5/2004 |
| KR | 1020040071597 | 8/2004 |
| WO | WO1999008182 | 2/1999 |
| WO | WO2001020848 | 3/2001 |
| WO | WO2003023986 | 3/2003 |
| WO | WO2003067465 | 8/2003 |
| WO | WO2007035732 | 3/2007 |

OTHER PUBLICATIONS

Ankur Jain, Final Office Action issued by the United States Patent and Trademark Office (12 pages); Notice of References Considered by Examiner (1page); dated Jun. 26, 2009 in U.S. Appl. No. 11/229,980 (Total 13 pages).
Australian Examination Report in Australian Application No. 2011201625, dated Sep. 11, 2012, 3 pages.
Canadian Examiner's Report in Canadian Application No. 2623021, dated May 17, 2013, 3 pages.
Chinese First Office Action in Chinese Application No. 200680042945.3, dated Nov. 12, 2010, with English translation, 7 pages.
Chinese Second Office Action in Chinese Application No. 200680042945.3, dated Feb. 16, 2012, with English translation, 9 pages.
Chinese Third Office Action in Chinese Application No. 200680042945.3, dated Jun. 13, 2012, with English translation, 6 pages.
David Eng, Combining static and dynamic data in code visualization, Proceedings of the 2002 ACM SIGPLAN-SIGSOFT workshop on Program analysis for software tools and engineering, pp. 43-45, published 2002.
European Search Report in European Application No. EP 06825015, dated Aug. 2, 2011, 8 pages.
Examiner Interview Summary mailed by the United States Patent and Trademark Office dated Feb. 24, 2009 in U.S. Appl. No. 11/243,916 (Total 2 pages).
Examiners First Report on Patent Application for Australian Government Patent Office, dated Dec. 21, 2009 in Australian Patent Application No. 2006292266.
Final Office Action issued by the United States Patent and Trademark Office (15 pages); Notice of References and Considered by Examiner (1 page); dated Oct. 1, 2008 in U.S. Appl. No. 11/243,916 (Total 16 pages).
Final Office Action issued by the United States Patent and Trademark Office (9 pages); Notice Of References Considered By Examiner (1 page); dated Sep. 10, 2008 in U.S. Appl. No. 11/229,980 (Total 10 pages).
Japanese Decision of Rejection in Japanese Application No. 2008-531433, dated Sep. 10, 2013, with English translation, 6 pages.
Japanese Office Action in Japanese Application No. 2008-531433, dated Jan. 4, 2012, with English translation, 9 pages.
Japanese Office Action in Japanese Application No. 2008-531433, dated Dec. 11, 2012, with English translation, 6 pages.
Korean Decision of Rejection in Korean Application No. 2008-7009376, dated Sep. 27, 2013, 6 pages.
Korean Office Action in Korean Application No. 10-2016-7016723, dated Oct. 11, 2016, 14 pages (with English translation).
Korean Office Action in Korean Application No. 2008-7009376, dated Feb. 1, 2013, with English translation, 16 pages.
Korean Office Action issued Korean Application No. 10-2018-7025142, dated Nov. 28, 2018, 14 pages (with English translation).
Non-Final Office Action issued by the United States Patent and Trademark Office (13 pages); Notice of References (1 page); dated Mar. 11, 2008 in U.S. Appl. No. 11/243,916 (Total 14 pages).
Non-Final Office Action issued by the United States Patent and Trademark Office (14 pages); Notice Of References and Considered By Examiner (1 page); in U.S. Appl. No. 11/243,916 (Total 15 pages).
Non-Final Office Action issued by the United States Patent and Trademark Office (11 pages); Notices Of References And Considered By Examiner (2 pages); Notice Of References (1 page); dated Mar. 6, 2008 in U.S. Appl. No. 11/229,980 (Total 14 pages).
Non-Final Office Action issued by the United States Patent and Trademark Office (12 pages); Notice Of References and Considered By Examiner (1 page); dated Jan. 28, 2009 in U.S. Appl. No. 11/229,980 (Total 13 pages).
Notice of Allowance issued in U.S. Appl. No. 11/243,916 dated Nov. 15, 2013, 12 pages.
PCT International Search Report, PCT/US06/36482, dated Mar. 20, 2007, pp. 1-3.
PCT/US2006/036482, International Preliminary Report on Patentability, dated Apr. 3, 2008, pp. 1-7.
Written Opinion of the International Searching Authority, PCT/US06/36482, dated Mar. 20, 2007, pp. 1-5.

\* cited by examiner

CUSTOMIZED DATA RETRIEVAL APPLICATIONS FOR MOBILE DEVICES PROVIDING INTERPRETATION OF MARKUP LANGUAGE DATA

CROSS REFERENCE TO RELATED APPLICATION

This application is a continuation of U.S. application Ser. No. 14/329,158, filed Jul. 11, 2014, which is a divisional of U.S. application Ser. No. 11/229,980, filed Sep. 19, 2005, the contents of which is incorporated by reference.

TECHNICAL FIELD

This description relates to software applications for mobile devices, and more particularly to customized data retrieval applications that provide rendering of markup language data.

BACKGROUND

Handheld mobile devices, such as cellular telephones and personal digital assistants (PDAs), are becoming increasingly powerful both in terms of processing power and the ability to provide access to data. The usefulness of these enhancements is often limited, however, by an inability of mobile devices to display data effectively due to the small size of the display and the limited memory resources relative to laptop and desktop computers.

There are beginning to be some applications that are specifically designed for handheld mobile devices. Many such applications are based on application development platforms also specifically designed for mobile devices, such as Java 2 Platform Micro Edition (J2ME), Binary Runtime Environment for Wireless (BREW), and other software codes and/or operating systems. Some applications that are designed for retrieving data from a remote location to a handheld mobile device are browsers that correspond to conventional browser applications in that they enable users to enter uniform resource locators (URLs) to retrieve information from any Internet web site. Other applications enable data to be retrieved by launching a separate browser application in response, for example, to selecting a hyperlink in a user interface. In addition, specialized, limited functionality applications are available that provide a mechanism to access data from dedicated application service providers.

SUMMARY

Systems and techniques are provided for retrieving and displaying information on a mobile device by integrating markup language rendering functions into a specialized data retrieval client application.

In one general aspect, information is retrieved to a mobile device using a data retrieval application installed on the mobile device. The data retrieval application includes instructions for presenting a structured data display on the mobile device, defining a structure of the structured data display, requesting selected hyperlinks included in the structured data display, and rendering markup language information received in response to the selected hyperlinks. A user request to retrieve data is received through the data retrieval application. Data is retrieved in response to the received user request. The retrieved data is displayed according to the structure of the structured data display, and a user is able to select a hyperlink in the displayed data to retrieve and render markup language information using the data retrieval application.

Implementations can include one or more of the following features. The data retrieval application is a search application or an electronic mail client application. A search user interface having a structure defined by the search application installed on the mobile device is displayed. The search user interface includes a predefined field for a user entry of a search query, and the user request to retrieve data includes a submission of a search query. The structured data display defines a structure of a search results user interface for presenting data responsive to the search query. The data responsive to the search query includes a hyperlink. A user selection of the hyperlink is received using the search results user interface, and a request for additional data based on information included in the hyperlink is sent. The additional data is received in a markup language format, and the markup-language-formatted data is rendered by the data retrieval application for display on a user interface of the mobile device.

A display of data on the mobile device is automatically adjusted by the search application based on one or more characteristics of the mobile device. The structured data display includes one or more user-selectable features defined by the search application installed on the mobile device. The one or more user-selectable features are operable to perform operations defined by the search application. When a user selection of a hyperlink in the displayed data is received, markup language information is retrieved and rendered without accessing a browser application.

In another general aspect, a data retrieval user interface is displayed on a mobile device. The data retrieval user interface includes a structure defined by predetermined data stored on the mobile device. User-defined information is received through the data retrieval user interface. A data retrieval request including the user-defined information is sent to a predetermined remote location. A response to the data retrieval request is received, and the response includes retrieved data. A retrieved data user interface is displayed on the mobile device. The retrieved data user interface displays the retrieved data in accordance with a structure defined by predetermined data stored on the mobile device, and the retrieved data includes one or more hyperlinks. Markup-language-formatted data associated with a hyperlink selected by a user is retrieved, and the markup-language-formatted data is rendered on the mobile device without accessing a separate browser application.

Implementations can include one or more of the following features. The predetermined remote location is a pre-stored address on the mobile device, and an address for retrieving the markup-language-formatted data is identified in the retrieved data. The retrieved data includes structured data that has a structure corresponding to the structure for displaying the retrieved data. The structure for the data retrieval user interface or the structure for displaying the retrieved data includes a user interface component for launching a predefined function, and the user interface component and the predefined function are defined by data stored on the mobile device. The predefined function involves retrieving additional data, and an additional retrieved data user interface is displayed on the mobile device. The additional retrieved data user interface displays the additional retrieved data in accordance with a structure corresponding to the predefined function and defined by predetermined data stored on the mobile device. The instructions comprise software code written using at least one of Java, Java 2

Platform Micro Edition (J2ME), Binary Runtime Environment for Wireless (BREW), Symbian operating system, a native operating system, Linux, a Pocket PC operating system, Palm operating system, a Microsoft operating system, or any other mobile software platform.

The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

Figure 1:
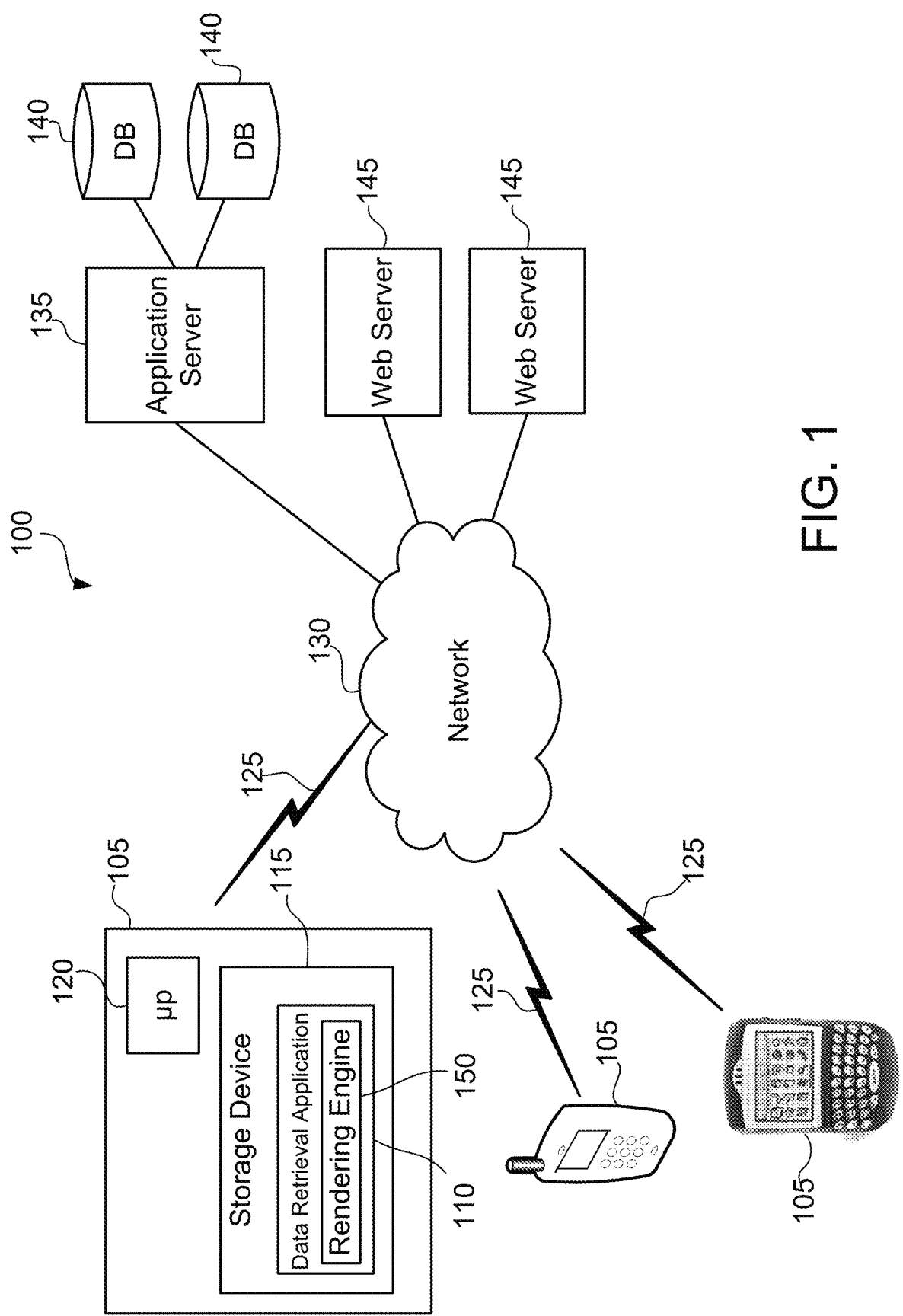
FIG. 1 is a block diagram of a system for retrieving data to a mobile device.

FIG. 1 is a block diagram of a system 100 for retrieving data to a mobile device 105. The mobile device 105 can be a cellular telephone, a PDA, or another type of handheld wireless communications device. The mobile device 105 is capable of executing one or more software applications, displaying information to a user, and receiving user input. The mobile device 105 includes a data retrieval application 110, such as a search application or an application for accessing a web-based electronic mail account, that is specially designed for use on mobile devices. The data retrieval application 110 is stored in a storage device 115 within the mobile device 105 and executes on a processor 120. The mobile device 105 operates to conduct wireless communications using a cellular, satellite, or other radio communication link 125 with other devices over a network 130. In particular, the mobile device 105 sends requests for data in accordance with instructions from the data retrieval application 110. The network 130 can include, for example, a public land mobile network, a public switched telephone network, a local area network, a wide area network, and/or any other type of telecommunication network.

The data retrieval application 110 generates graphical user interfaces (e.g., pages or views) that may include some of the features typically found on web pages that are used for retrieving data. For example, if the data retrieval application 110 is a search application, the graphical user interface displayed by the data retrieval application 110 can include one or more data entry fields for a user to define a search query or other search parameters, similar to a typical search engine website. For displaying search results, the graphical user interface displayed by the data retrieval application 110 can include a listing of search results, one or more data entry fields for a user to refine a search query or start a new search, and/or other features, such as links to other pages of the search results. If the data retrieval application 110 is an electronic mail application, the graphical user interface displayed by the data retrieval application 110 can include different mailboxes, such as an inbox, a mailbox for sent messages, and a mailbox for deleted messages. For each mailbox, the data retrieval application 110 can display a list or partial list of messages.

Web pages are generally written in hypertext markup language (HTML) and displayed using a browser application that interprets HTML tags included in the web page and determines how to represent the content (e.g., text and images) on a graphical user interface. Conventional search engines and web-based electronic mail services, for example, use HTML web pages. The content, appearance, and layout of such web pages is defined using HTML. When a user enters a URL for a search engine web page in a browser application, the browser retrieves the web page associated with the entered URL from a server location identified by the entered URL. The retrieved web page defines (or contains links to definitions) of the content, appearance, and layout of the information to be displayed. Other markup languages can be used instead of or in addition to HTML, including extensible hypertext markup language (XHTML), wireless markup language (WML), compact hypertext markup language (CHTML), extensible markup language (XML), and/or any other markup language.

Unlike a web page, the structure of the graphical user interfaces generated by the data retrieval application 110 is not defined in a retrieved web page. Instead, the data retrieval application 110 includes code defining a structure of a structured data display. The structure includes appearance aspects (e.g., what do displayed user interface components, text, graphics, and other displayed items look like) and layout aspects (e.g., how are items arranged on a display screen, where does a data entry field appear relative to a link to a help or menu feature, and the like). In general, the structure can be defined to account for features of the mobile device 105, such as screen size and available memory. For example, the structure may be defined to enable convenient viewing and scrolling on a mobile device display screen (e.g., to avoid excessive wrap-around of text and images by limiting the number of options presented and selecting font sizes that enable information to be logically arranged on the screen) and/or to account for potentially limited memory resources (e.g., by limiting the size and amount of unnecessary graphics). In some implementations, the data received by the data retrieval application 110 can be structured data, while in other implementations, the received data can be unstructured data.

In addition to structure, the structured data display can also include content, which can be defined by data that is retrieved from an application server 135. In general, information that is static, such as instructional text, labels, and headings, can be considered part of the appearance of the graphical user interface and is defined by the data retrieval application 110. Content data that is displayed by the data retrieval application 110, on the other hand, is generally retrieved from an application server 135. Content data includes dynamic information that is typically the primary basis for using the data retrieval application 110. For example, content data can include a listing of search results in a search application or a listing of messages in an electronic mail application. Content data can include snippets of information, which is a piece of the information available. For example, in an email application, a snippet may include a subject and a sender of the email, one or both of which may be truncated depending on their length and the amount of available space.

Although the content data can be considered to be distinct from the structure, the content data can be displayed in a graphical user interface in accordance with a structure defined by the data retrieval application 110. For example, the defined structure for an email graphical user interface may dictate that, for each message in a mailbox, a snippet of information is to be displayed, and the snippet includes one line of received date information, one line of sender information, and one line of subject information, with each line being truncated as necessary. Thus, the content is defined according to the data retrieved from the application server 135, while how the content data is displayed is defined according to the structure included in the data retrieval application 110 or otherwise stored on the mobile device 105 and accessed by the data retrieval application 110. In some situations, the structure can be defined to be dynamic. For example, a item in a list may typically include a snippet of only one or two lines of information unless the item is highlighted using a scrolling function, in which case the structure of the item may change to a snippet of three or four lines of information.

By storing data defining the structure of graphical user interfaces for the data retrieval application 110 in the data retrieval application 110 itself or otherwise on the mobile device 105, the graphical user interfaces can be conveniently customized according to the constraints and characteristics of the mobile device 105. For example, the structure of the graphical user interfaces can be formatted and adjusted in ways that are not supported by conventional HTML browsers. In some implementations, the graphical user interfaces can be specially designed or customized for use on mobile devices 105 in general, without necessarily being designed for a particular type of mobile device 105. Even without customization at the mobile device type level, substantial benefits can be achieved in terms of convenience and usability versus using a browser application to retrieve a web page that might be designed for use on full-size monitor.

In some implementations, the data retrieval application 110 is an application that is designed specifically for the type (e.g., manufacturer, product family, and/or model) of mobile device 105. In other implementations, the data retrieval application 110 is a generic application designed to run on a wide variety of mobile devices 105. In the latter case, the data retrieval application 110 can include software code for automatically extracting characteristics data and parameters of the mobile device 105. Based on the extracted information, the data retrieval application 110 can use built-in algorithms to determine customized structure data or to select from a set of predefined customized structure data. In either case, the structure data is maintained on the mobile device 105 for defining the structure of structured data displays for the data retrieval application 110. In some implementations, characteristics data and parameters can be manually entered by a user through a user interface. For purposes of this description, a user interface can include physical components through which a user can receive and/or provide information (e.g., a monitor, keyboard, display screen, mouse, speakers, and the like) and actual representations of information (e.g., sounds, graphical user interfaces and components thereof, text, images, etc.).

To facilitate portability and/or compatibility among different devices and type of devices, the data retrieval application 110 can be implemented, for example, on a Java platform, a J2ME platform, a BREW platform, a Symbian operating system, a native operating system, Linux, a Pocket PC operating system, a Palm operating system, a Microsoft operating system, or any other mobile software platform. The data retrieval application 110 can include software code defining the structure and other operations and features of the data retrieval application 110, or the structure, other operations, and/or other features of the data retrieval application 110 can be stored in one or more separate files on the mobile device 105. In some cases, the structure or certain elements of the structure can be defined using HTML that is stored on the device and interpreted by a rendering engine built into the data retrieval application 110.

Local storage of structure data also enables the structure to include functional aspects. The functional aspects of the structure and/or a structured data display can include specialized functions that are included in the graphical user interfaces of the data retrieval application 110 based on the type of application (e.g., search or email application) and/or the particular graphical user interface being displayed. For example, in a search application, the structured data display of a graphical user interface used to display results can include a button or other user interface component for sending a short message service (SMS) or email message of information regarding a selected item in a search results list. Similarly, the structured data display can include a user interface component for resubmitting a search query with additional parameters (e.g., search news articles or local information only or search for product listings), for retrieving additional structured data (e.g., driving directions or a map), or dialing a listing. Software code and/or data for defining the appearance, layout, and functional operations of user interface components that perform specialized functions is included in the data retrieval application 110 itself or otherwise stored on the mobile device 105.

The data retrieval application 110 can be associated with an application server 135 at a predetermined remote location, which can be identified by a predetermined address (e.g., a URL) stored in the data retrieval application 110 or on the mobile device 105. In some cases, the predetermined address can change on occasion, such as when the services provided by the application server 135 are moved to a different server. In such a case, it may be possible to update the stored predetermined address. In some implementations, the predetermined address may be associated with a server that assigns another address for handling a request from the data retrieval application 110 (e.g., for purposes of load distribution).

Although the application server 135 may be accessed using a URL in some implementations, the application server 135 can interact with the data retrieval application 110 in a different way than typical web servers interact with browser applications. In particular, the application server 135 does not necessarily simply return an HTML web page in response to a request from the data retrieval application 110. Instead, the application server 135 may format data in a manner that corresponds to the predefined structure of a graphical user interface for the data retrieval application 110. For example, the retrieved data can include structured data (e.g., snippets) without including HTML or other code relating to how to display the structured data. In addition, the retrieved data can be structured according to predefined data fields used for communicating between the application server 135 and the data retrieval application 110. In some implementations, however, the data retrieval application 110 may receive an ordinary HTML web page and may extract the relevant content data for display in a graphical user interface in accordance with the locally stored structure data rather than the HTML code included in the received web page.

In response to a request from the data retrieval application 110, the application server 135 can access information from one or more databases 140 associated with the application server 135 or from other servers 145 (e.g., servers supporting other web pages or otherwise maintaining additional data) through the network 130. The databases 140, for example, can include data previously mined from other web sites or can store messages and profile information (e.g., security information) associated with email accounts. In some cases, such as in response to a search query from a search application, the application server 135 may retrieve data from another server 145.

As discussed above, the data retrieval application 110 can include additional specialized functions, which can include requests for additional structured data. The additional structured data can also be presented in a graphical user interface having a structure that is predefined by the data retrieval application 110. In addition, some links that are presented by the data retrieval application 110 in a graphical user interface, if selected by a user, can result in retrieving additional data that is also presented in a graphical user interface having a structure that is predefined by the data retrieval application 110. For example, when a user selects a snippet for a particular email message, the email message may also be presented in accordance with a predefined structure rather than using HTML code associated with the retrieved email message. In other words, the structure of the email message presentation is in accordance with the locally defined structure rather than that defined in the retrieved email message HTML.

In other cases, the retrieved data (i.e., the content data) that is presented in a graphical user interface can include hyperlinks (e.g., hypertext links and/or non-text-based links) to sources or data for which the data retrieval application 110 does not include a predefined structure. For example, in some implementations, each email snippet may constitute a hyperlink to the full email for which the data retrieval application 110 does not define a structure. If a user selects such a link, the data retrieval application 110 can retrieve a web page identified in the hyperlink and use a built-in markup language rendering engine 150 to render the retrieved markup-language-formatted data. As another example, retrieved data presented in a structured data display may include a hyperlink, which, if selected by a user, results in retrieving a web page from a server 145 associated with an address identified in the hyperlink.

In other words, the markup language rendering engine 150 is integrated into and included as part of the data retrieval application 110 in a single executable software application (e.g., the markup language rendering engine 150 is compiled together with other modules of the data retrieval application 110). The markup language rendering engine 150 can operate in accordance with hypertext markup language (HTML), extensible hypertext markup language (XHTML), wireless markup language (WML), compact hypertext markup language (CHTML), extensible markup language (XML), and/or any other markup language.

Unlike conventional applications that support hypertext and other hyperlinks, which typically launch a separate, default browser application to retrieve data associated with a hyperlink, the data retrieval application 110 does not use an inter-application program call to launch or otherwise access the functionalities of a separate browser application. As a result, the data retrieval application 110 avoids the potential for an unsatisfactory user experience that can result from the delays generally inherent in activating a separate browser application and loading a web page. The data retrieval application 110 also provides for convenient access to a broad set of data associated with an initial set of retrieved data and allows viewing of results that are web-specific within the data retrieval client application 110.

Moreover, unlike browser applications, the data retrieval application 110 generally allows users to follow links that are included in retrieved data (or on pages that are retrieved through a link included in retrieved data) but not to otherwise surf the Internet or enter arbitrary website addresses or URLs because the data retrieval application 110 does not include an address bar. In some implementations, data rendered by the markup language rendering engine 150 and/or presented on a display can be formatted in a customized or partially customized manner (e.g., determining where to cut off lines of text, determining a size and/or resolution of images, and determining a number of lines in a snippet) based on one or more characteristics of the mobile device 105 (e.g., font metrics, screen width, amount of memory available, and screen height).

FIGS. 2A-2E illustrate a mobile device 205 operating in accordance with a search application to initiate a search. The mobile device includes a keyboard user interface 215 and a screen or display user interface 220, on which is displayed a search graphical user interface 225. The search graphical user interface 225, in this example, is a search query input page that includes a search query field 230 and an optional location field 235 but that does not include content data (i.e., because no data has been retrieved yet). The search graphical user interface 225 has a structure that is defined by the search application stored locally on the mobile device 205. Accordingly, when a user opens the search application on the mobile device 205, the search graphical user interface 225 can be displayed based on locally stored data and instructions, rather than retrieving the page from a remote server. In addition, the search graphical user interface 225 can be customized or substantially customized for use on the mobile device 205 (e.g., to provide a meaningful display without much if any scrolling).

Figure 2A:
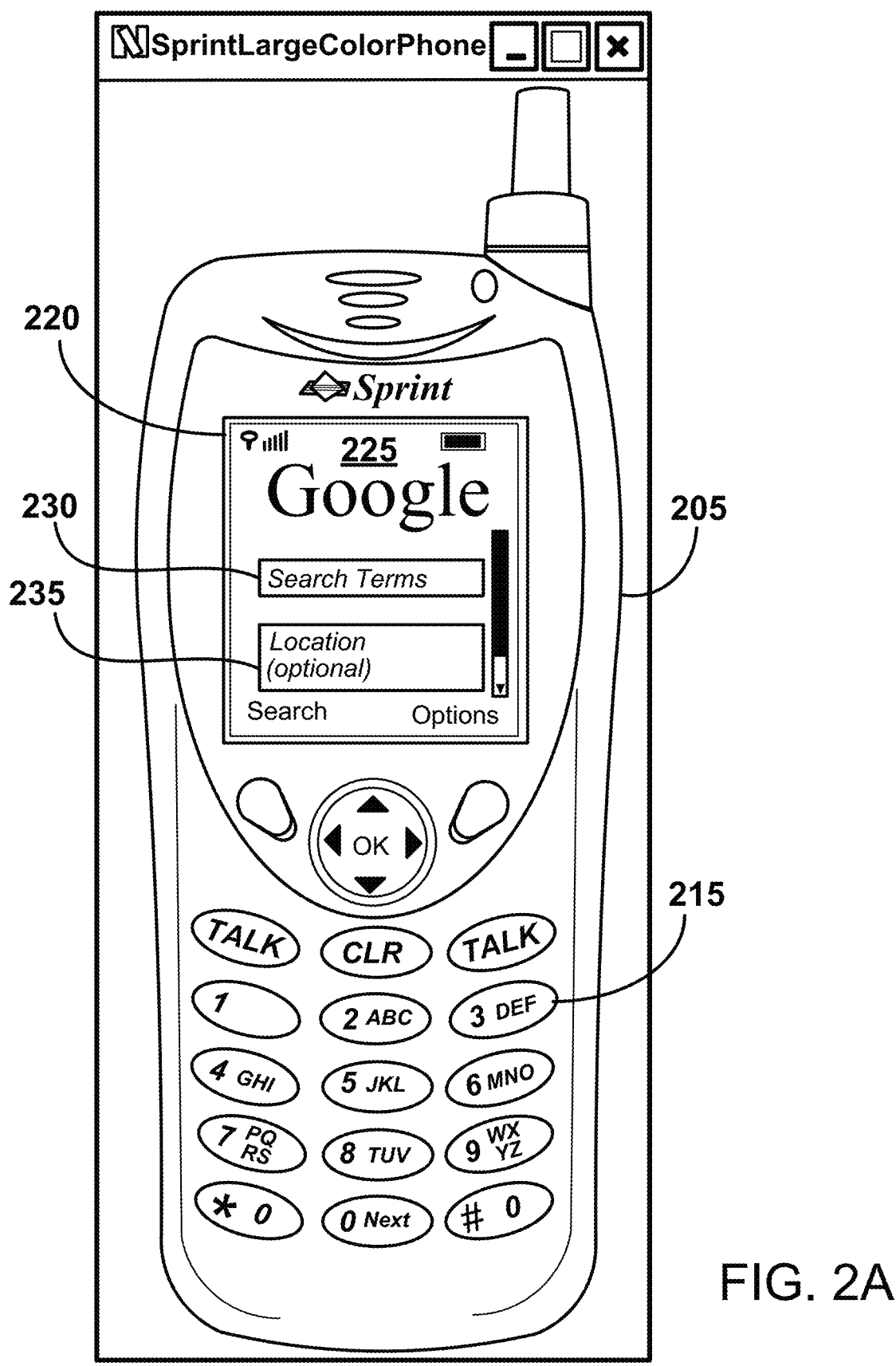
FIGS. 2A-2E illustrate a mobile device operating in accordance with a search application to initiate a search.
Figure 2B:
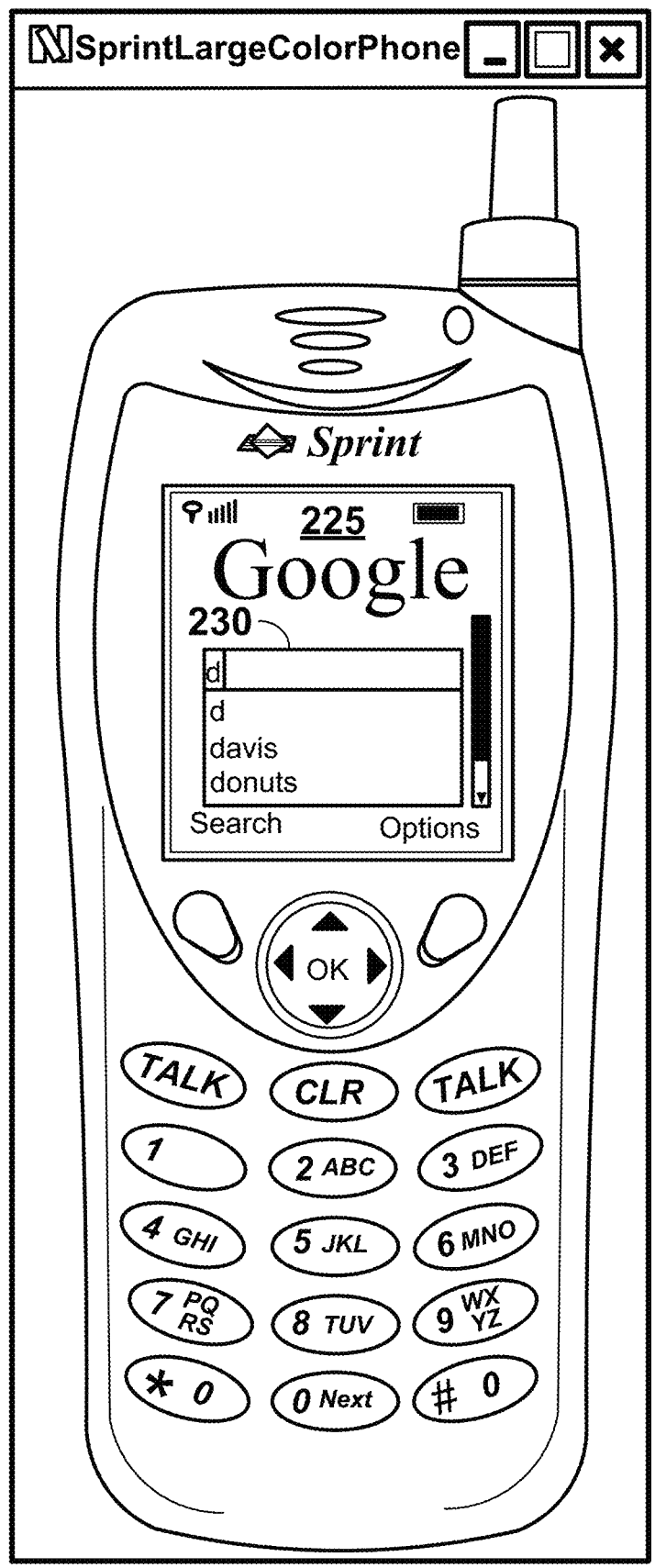
Figure 2C:
Figure 2D:
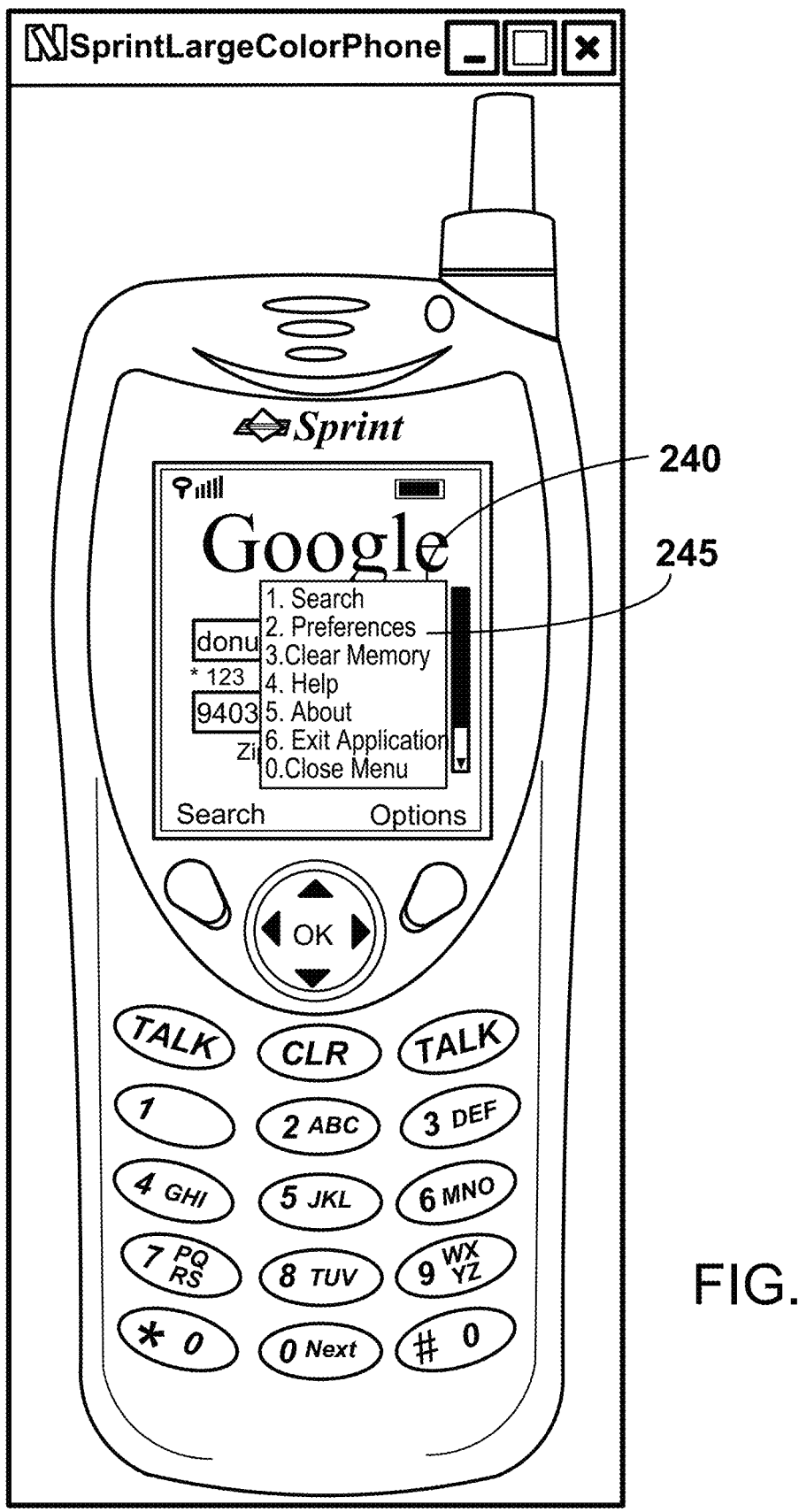
Figure 2E:
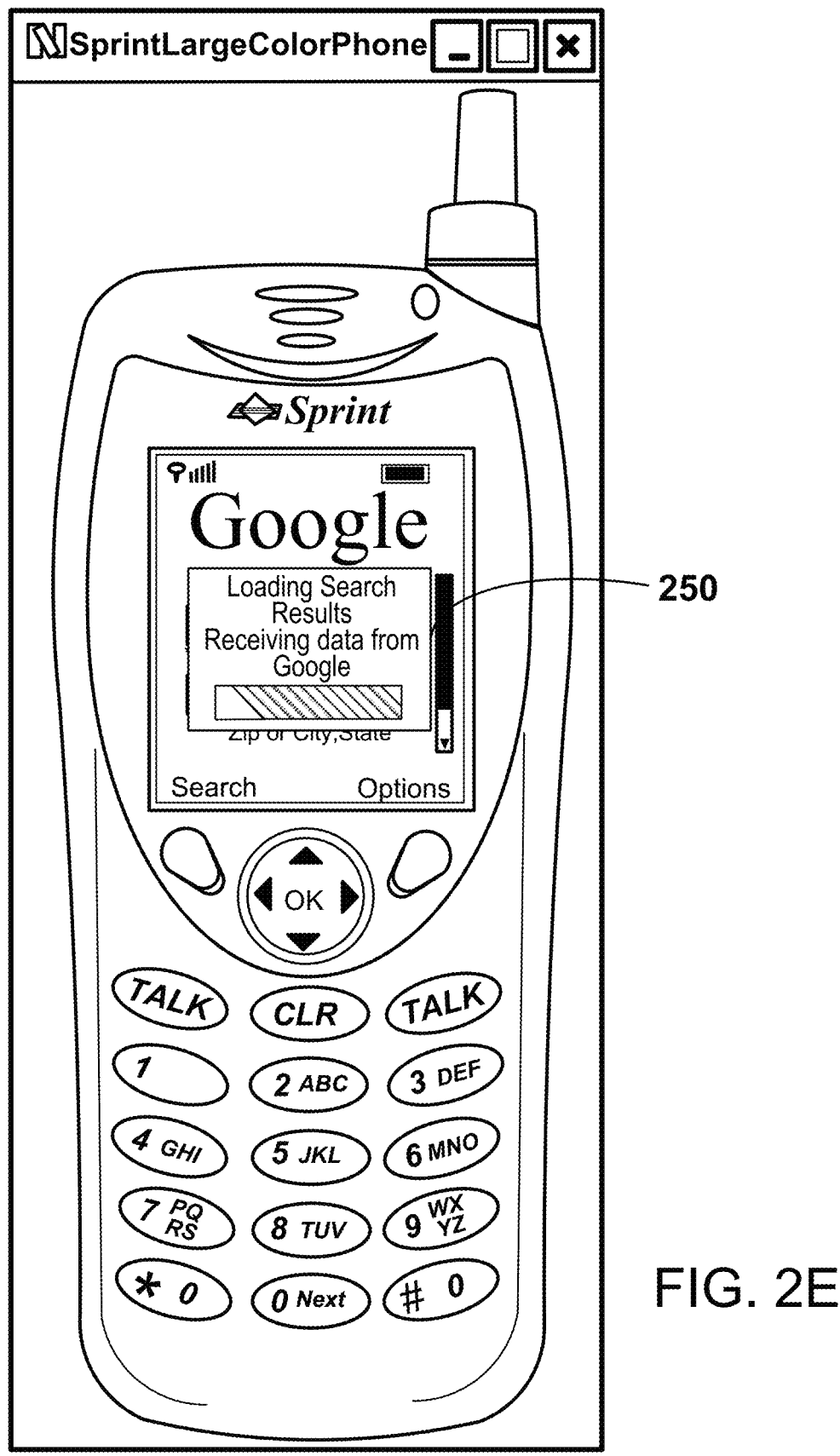

A user enters a search term in the search query field 230 (see FIGS. 2B and 2C) and a zip code in the optional location field 235 (see FIG. 2C). As a result of a user interaction with the keyboard user interface 215 (e.g., selecting "OK" or "Options"), the search application displays a pop-up options menu 240 on the search graphical user interface 225 (see FIG. 2D). The user can select (e.g., by pressing "OK") a search option 245, in response to which the search application sends a request (containing the user-selected query data) to retrieve responsive data to an application server. While waiting for results, the search application displays a "loading search results" message 250 (see FIG. 2E). Using the search application, all of the display operations depicted in FIGS. 2A-2E can be performed without receiving appearance, layout, or functional data from a remote server.

Figure 3A:
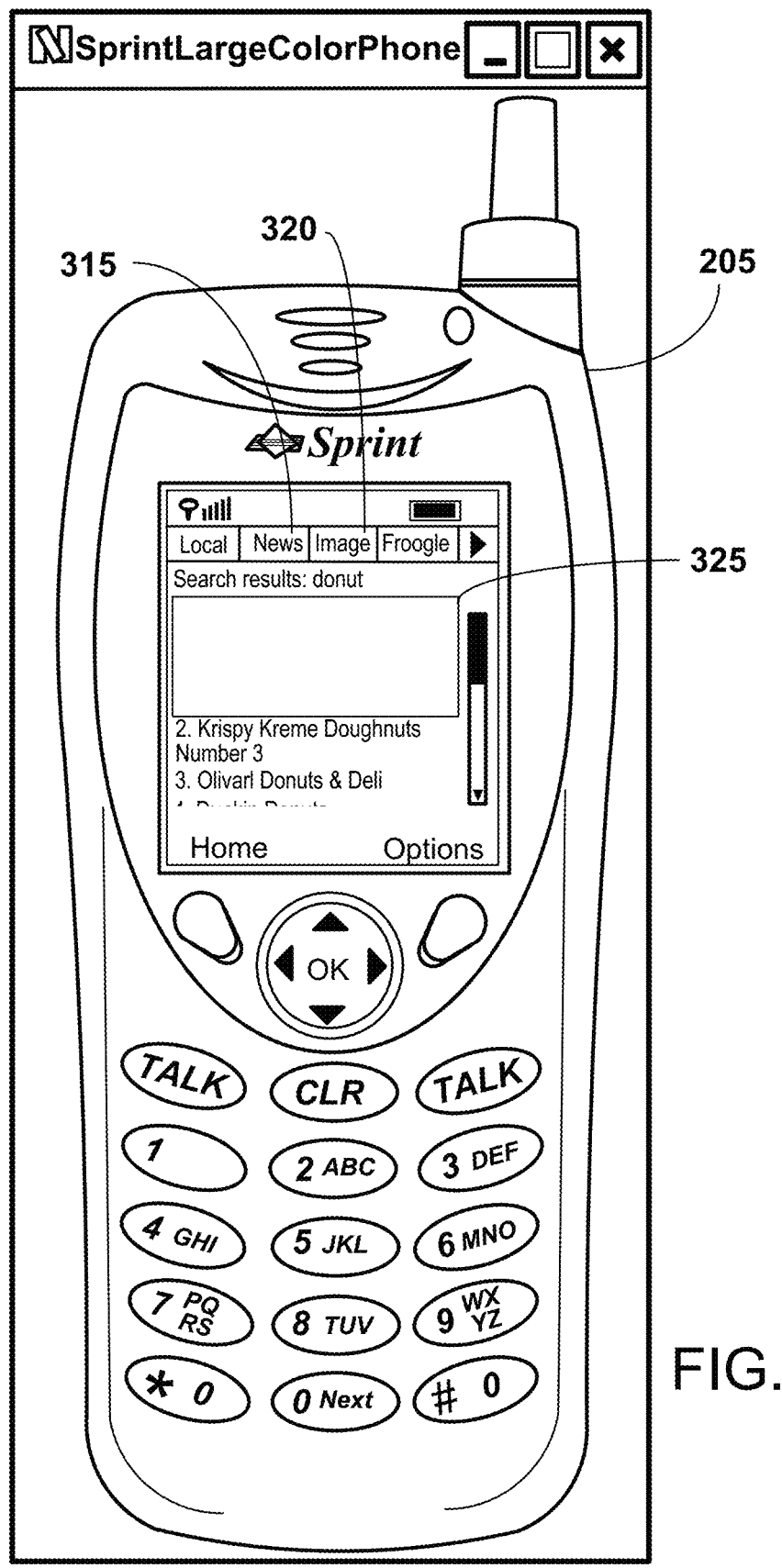
FIGS. 3A-3C illustrate the mobile device operating in accordance with a search application to display search results in response to the request of FIGS. 2A-2E.
Figure 3B:
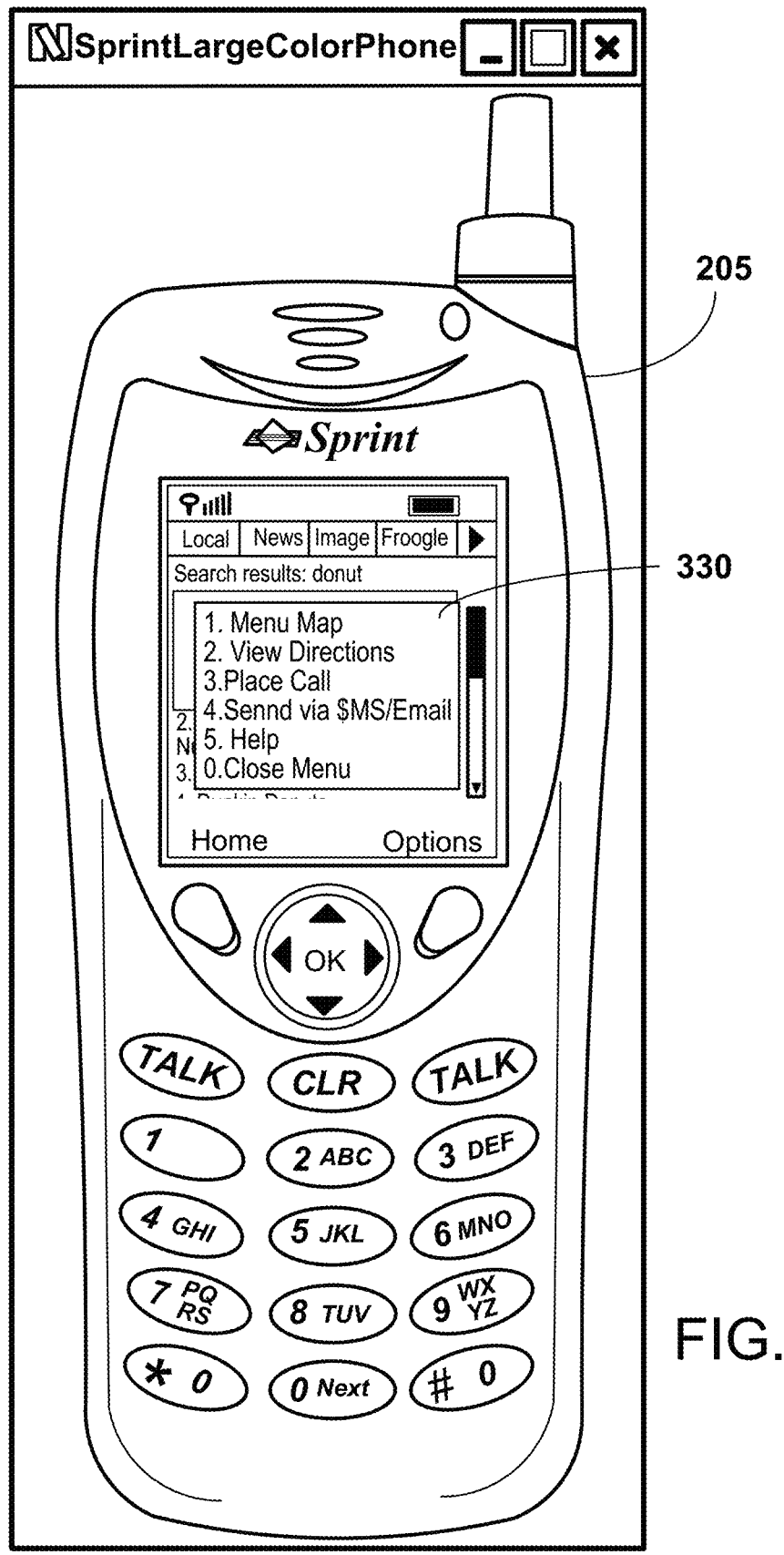
Figure 3C:
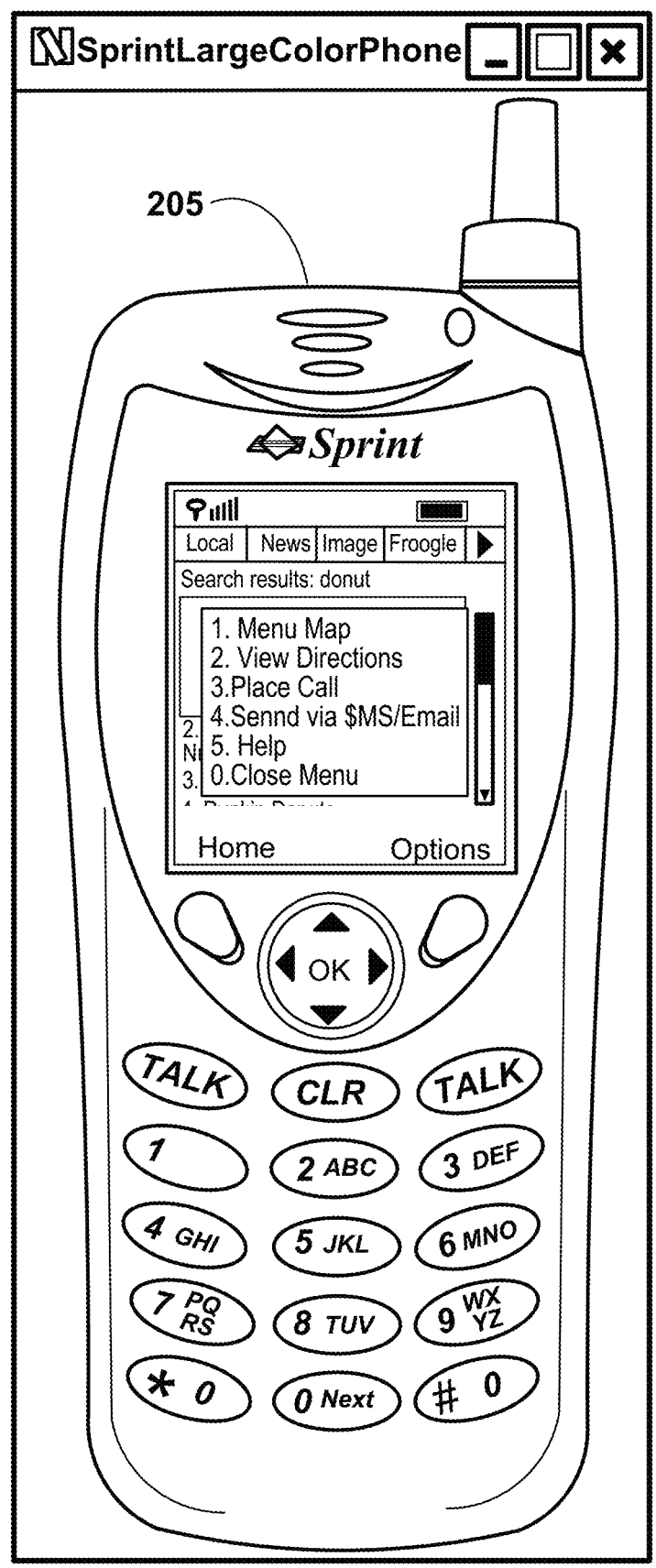

FIGS. 3A-3C illustrate the mobile device 205 operating in accordance with a search application to display search results in response to the request of FIGS. 2A-2E. After receiving retrieved data in response to the request, the search application displays a results graphical user interface 310 that includes a list of search results in accordance with a structure defined by the search application. The list of search results includes content data received from the application server but is formatted according to the locally defined structure. In addition, the results graphical user interface 310 displays other data in accordance with functional aspects of a locally defined structure, including options to resubmit the search to obtain news results (at 315) or to obtain image results (at 320).

As also defined by the search application, by highlighting a particular search result 325 in the list, a larger snippet is displayed than for other results (see FIG. 3A). In response to a user selection of the particular search result 325, the search application displays a pop-up options menu 330 that includes additional functional options that can be applied to the particular search result 325 (see FIGS. 3B and 3C), which are defined by functional aspects of the structure for the search application. A user can scroll between options, a user selection of which initiates additional functionality of the locally stored search application. Although the search application defines the functionality of the additional functional aspects, it may or may not present results of such functions in accordance with a locally predefined structure, depending on the particular implementation. In addition, certain selections (e.g., selecting "OK" when the particular search result 325 is highlighted) can be a selection of a hyperlink, the results of which can be interpreted by a markup language rendering engine that is part of the search application.

Figure 4:
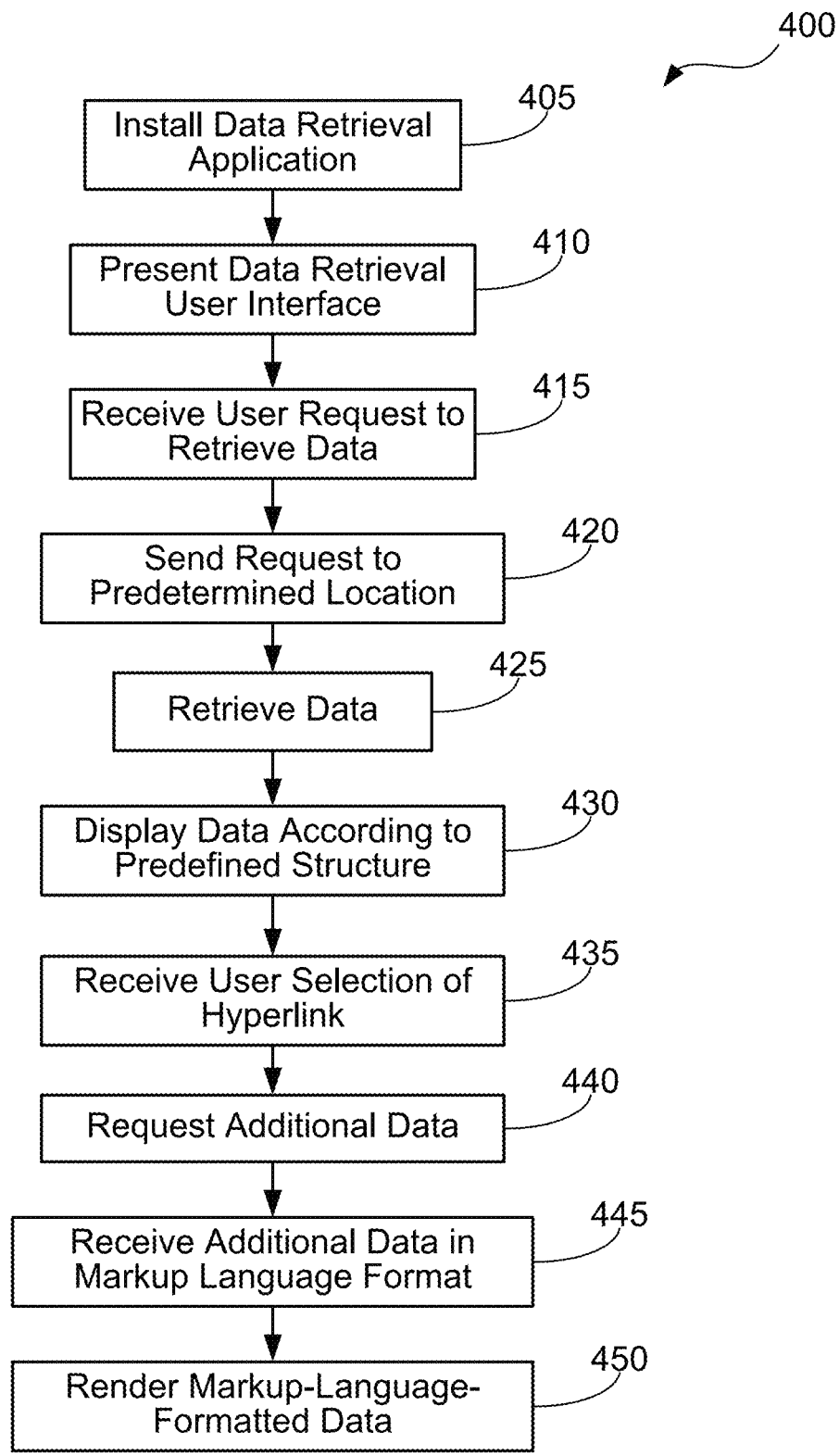
FIG. 4 is a flow diagram of a process for retrieving information to a mobile device.

FIG. 4 is a flow diagram of a process 400 for retrieving information to a mobile device. A data retrieval application is installed on the mobile device (405). The data retrieval application can be a search application, an email application, or some other data retrieval application. The data retrieval application can include instructions for presenting a structured data display on the mobile device, for defining a structure of the structured data display, for requesting selected hyperlinks included in the structured data display, and for rendering markup language information received in response to the selected hyperlinks. A data retrieval user interface is presented by the data retrieval application (410). The data retrieval user interface can have a structure defined by predetermined data stored on the mobile device. A user request to retrieve data is received through the data retrieval application (415). The user request can include user-defined information, such as a search query. In the case of a search application, for example, the data retrieval user interface can be a search request user interface having a structure defined by the search application, and the user request can be received through the search request user interface.

The user request is sent to a predetermined remote location (420), which can be defined by an address that is pre-stored on the mobile device. Data is retrieved in response to the received user request (425). The retrieved data is displayed according to a structure of a structured data display (430), which includes a structure defined by predetermined data stored on the mobile device. In the case of a search application, the structured data display can be a search results user interface.

In some cases, the displayed data includes one or more hyperlinks. In response to a user selection of a hyperlink (435), a request for additional data is sent based on information (e.g., an address or URL) included in the hyperlink (440). The additional data is received in a markup language format (445), and the markup-language-formatted data is rendered by the data retrieval application for display on a user interface of the mobile device (450). The rendering is performed without accessing a browser application. In some cases, the rendering of the markup-language-formatted data to generate a display (at 450) or displaying the structured data display (at 430) can include automatically adjusting the display of data on the mobile device based on one or more characteristics of the mobile device.

The systems and all of the functional operations described in this specification can be implemented in digital electronic circuitry, or in computer software, firmware, or hardware, including the structural means disclosed in this specification and structural equivalents thereof, or in combinations of them. The techniques can be implemented as one or more computer program products, i.e., one or more computer programs tangibly embodied in an information carrier, e.g., in a machine readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform the described functions by operating on input data and generating output. The processes and logic flows can also be performed by, and apparatus can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, the processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, aspects of the described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made. For example, operations of the logic flows depicted in FIG. 4 can be performed in a different order than that shown and/or can be performed iteratively. Accordingly, other implementations are within the scope of the following claims.

What is claimed is:

1. A method comprising:
providing, by a mobile device and using a native mobile application other than a browser application, a first graphical user interface that includes a query input page having a structure that is defined by programmed code of the native mobile application that is stored locally on the mobile device, wherein the query input page includes a query term input field, wherein the native mobile application includes programmed code for extracting characteristics data and parameters of the mobile device;
obtaining, by the mobile device, one or more query terms that were input by a user into the query input page;
providing, by the mobile device, the obtained one or more query terms to a remote computer;
receiving, by the mobile device and from the remote computer, content data including search results that is responsive to a query that is based on the obtained one or more query terms; and
rendering, by the mobile device and using the native mobile application, a second graphical user interface having a formatted representation of the content data that is defined by programmed code of the native mobile application based on the extracted characteristics data and parameters of the mobile device, that is stored locally on the mobile device, wherein the second graphical user interface includes the search results identified by the received content data that is responsive to the query.

2. The method of claim 1, wherein the first graphical user interface includes one or more user-selectable features defined by programmed code of the native mobile application that is stored locally on the mobile device.

3. The method of claim 1, wherein the second graphical user interface includes one or more user-selectable features defined by programmed code of the native mobile application that is stored locally on the mobile device.

4. The method of claim 3, wherein the one or more user-selectable features defined by programmed code of the native mobile application includes a hyperlink that references a network location storing data corresponding to a web page identified by one search result of the set of search results.

5. The method of claim 4, the method further comprising:
receiving, by the native mobile application, data indicating a selection of the hyperlink;
in response to the receipt of data indicating the selection of the hyperlink, retrieving, by the native mobile application, mark-up language information from the referenced network location; and
rendering, by the native mobile application, the retrieved mark-up language without using a browser application.

6. The method of claim 5, wherein rendering, by the native mobile application, the retrieved mark-up language without using a browser application comprises adjusting, by the native mobile application, a display of the mark-up language data in the display of the mobile device based on one or more characteristics of the mobile device.

7. The method of claim 1, wherein rendering, by the mobile device and using the native mobile application, a second graphical user interface further comprises:
adjusting, by the native mobile application, the display of the second graphical user interface in the display of the mobile device based on one or more characteristics of the mobile device.

8. The method of claim 1, the method further comprising:
receiving, by the mobile device, a request to open a native search application;
in response to receiving, by the mobile device, the request to open the native search application, providing, by the mobile device, the first graphical user interface that includes a query input page having a structure that is defined by programmed code of the native mobile application that is stored locally on the mobile device without requesting data describing the structure of the graphical user interface from a remote computer.

9. A system comprising:
one or more computers and one or more storage devices storing instructions that are operable, when executed by one or more computers, to cause the one or more computers to perform the operations comprising:
providing, by a mobile device and using a native mobile application other than a browser application, a first graphical user interface that includes a query input page having a structure that is defined by programmed code of the native mobile application that is stored locally on the mobile device, wherein the query input page includes a query term input field, wherein the native mobile application includes programmed code for extracting characteristics data and parameters of the mobile device;
obtaining, by the mobile device, one or more query terms that were input by a user into the query input page;
providing, by the mobile device, the obtained one or more query terms to a remote computer;
receiving, by the mobile device and from the remote computer, content data including search results that is responsive to a query that is based on the obtained one or more query terms; and
rendering, by the mobile device and using the native mobile application, a second graphical user interface having a formatted representation of the content data that is defined by programmed code of the native mobile application based on the extracted characteristics data and parameters of the mobile device, that is stored locally on the mobile device, wherein the second graphical user interface includes the search results identified by the received content data that is responsive to the query.

10. The system of claim 9, wherein the first graphical user interface includes one or more user-selectable features defined by programmed code of the native mobile application that is stored locally on the mobile device.

11. The system of claim 9, wherein the second graphical user interface includes one or more user-selectable features defined by programmed code of the native mobile application that is stored locally on the mobile device.

12. The system of claim 11, wherein the one or more user-selectable features defined by programmed code of the native mobile application includes a hyperlink that references a network location storing data corresponding to a web page identified by one search result of the set of search results.

13. The system of claim 12, the operations further comprising:
receiving, by the native mobile application, data indicating a selection of the hyperlink;
in response to the receipt of data indicating the selection of the hyperlink, retrieving, by the native mobile application, mark-up language information from the referenced network location; and
rendering, by the native mobile application, the retrieved mark-up language without using a browser application.

14. The system of claim 13, wherein rendering, by the native mobile application, the retrieved mark-up language without using a browser application comprises adjusting, by the native mobile application, a display of the mark-up language data in the display of the mobile device based on one or more characteristics of the mobile device.

15. The system of claim 9, wherein rendering, by the mobile device and using the native mobile application, a second graphical user interface further comprises:
adjusting, by the native mobile application, the display of the second graphical user interface in the display of the mobile device based on one or more characteristics of the mobile device.

16. The system of claim 9, the operations further comprising:
receiving, by the mobile device, a request to open a native search application;
in response to receiving, by the mobile device, the request to open the native search application, providing, by the mobile device, the first graphical user interface that includes a query input page having a structure that is defined by programmed code of the native mobile application that is stored locally on the mobile device without requesting data describing the structure of the graphical user interface from a remote computer.

17. A computer-readable storage device having stored thereon instructions, which, when executed by data processing apparatus, cause the data processing apparatus to perform operations comprising:
providing, by a mobile device and using a native mobile application other than a browser application, a first graphical user interface that includes a query input page having a structure that is defined by programmed code of the native mobile application that is stored locally on the mobile device, wherein the query input page includes a query term input field, wherein the native mobile application includes programmed code for extracting characteristics data and parameters of the mobile device;
obtaining, by the mobile device, one or more query terms that were input by a user into the query input page;
providing, by the mobile device, the obtained one or more query terms to a remote computer;
receiving, by the mobile device and from the remote computer, content data including search results that is responsive to a query that is based on the obtained one or more query terms; and
rendering, by the mobile device and using the native mobile application, a second graphical user interface having a formatted representation of the content data that is defined by programmed code of the native mobile application based on the extracted characteristics data and parameters of the mobile device, that is stored locally on the mobile device, wherein the second graphical user interface includes the search results identified by the received content data that is responsive to the query.

18. The computer-readable storage device of claim 17, wherein the second graphical user interface includes one or more user-selectable features defined by programmed code of the native mobile application that is stored locally on the mobile device.

19. The computer-readable storage device of claim 18, wherein the one or more user-selectable features defined by programmed code of the native mobile application includes a hyperlink that references a network location storing data corresponding to a web page identified by one search result of the set of search results.

20. The computer-readable storage device of claim 19, the operations further comprising:
receiving, by the native mobile application, data indicating a selection of the hyperlink;
in response to the receipt of data indicating the selection of the hyperlink, retrieving, by the native mobile application, mark-up language information from the referenced network location; and
rendering, by the native mobile application, the retrieved mark-up language without using a browser application, wherein rendering, by the native mobile application, the retrieved mark-up language without using a browser application comprises adjusting, by the native mobile application, a display of the mark-up language data in the display of the mobile device based on one or more characteristics of the mobile device.

* * * * *